US012592652B2

(12) United States Patent
Fan et al.

(10) Patent No.: US 12,592,652 B2
(45) Date of Patent: Mar. 31, 2026

(54) HIG EFFICIENCY AC-DC CONVERTER

(71) Applicants: Jianping Fan, Hayward, CA (US);
Xiaoping Jin, Hayward, CA (US)

(72) Inventors: Jianping Fan, Hayward, CA (US);
Xiaoping Jin, Hayward, CA (US)

( * ) Notice: Subject to any disclaimer, the term of this
patent is extended or adjusted under 35
U.S.C. 154(b) by 148 days.

(21) Appl. No.: 18/406,985

(22) Filed: Jan. 8, 2024

(65) Prior Publication Data

US 2025/0226761 A1    Jul. 10, 2025

(51) Int. Cl.
*H02M 7/219* (2006.01)
*H02M 1/00* (2006.01)
*H02M 7/04* (2006.01)

(52) U.S. Cl.
CPC ....... *H02M 7/2195* (2021.05); *H02M 1/0058*
(2021.05); *H02M 7/05* (2021.05)

(58) Field of Classification Search
CPC ..... H02M 7/2195; H02M 7/05; H02M 1/0058
See application file for complete search history.

(56) References Cited

U.S. PATENT DOCUMENTS

| | | | | |
|---|---|---|---|---|
| 11,705,815 | B1* | 7/2023 | Shi | H02M 1/0096 |
| | | | | 363/17 |
| 2020/0395839 | A1* | 12/2020 | Ayyanar | H02M 1/4208 |
| 2022/0393605 | A1* | 12/2022 | Mazurek | H02M 3/33584 |

FOREIGN PATENT DOCUMENTS

| | | | | |
|---|---|---|---|---|
| CN | 119921581 A | * | 5/2025 | |
| WO | WO-2023193914 A1 | * | 10/2023 | H02M 1/4233 |

* cited by examiner

*Primary Examiner* — Adolf D Berhane

(57) ABSTRACT

A high efficiency AC-DC converter with a single stage circuit on primary side to provide integrated functionalities of Power Factor Correction and isolated DC-DC conversion in combination with the isolation transformer and rectifier circuit on the secondary side. A plurality of operating methods of primary circuit are disclosed to realize the integrated power processing functions with zero voltage switching operation. A specific operating method of the secondary circuit is also disclosed for the system to maintain near unity power factor. In addition to the potential of reducing system cost, reducing space requirement and improving power conversion efficiency, the disclosed concept has also effectively eliminated the necessity of additional circuitry for inrush current limiting at startup of the input power.

5 Claims, 4 Drawing Sheets

A

B. RESONANCE OPERATING CONCEPT 1

C. RESONANCE OPERATING CONCEPT 2

A

B. RESONANCE OPERATING CONCEPT 1

C. RESONANCE OPERATING CONCEPT 2

A

B. RESONANCE OPERATING CONCEPT 1

C. RESONANCE OPERATING CONCEPT 2

D. RECTIFIER OPERATING CONCEPT

A

B.  PWM OPERATING CONCEPT 1

C.  PWM OPERATING CONCEPT 2

HIG EFFICIENCY AC-DC CONVERTER

BACKGROUND

1. Field of the Invention

The invention is generally related to AC-DC converter topology and more particularly to utilizing a particular converter topology to realize combined functionalities of power factor correction and isolated DC to DC conversion with a single stage conversion circuit. In addition, the disclosed converter circuit provides soft switching operation and eliminates the need of inrush current limiting circuitry at input power start up.

2. Description of the Related Art

In high power AC-DC power conversion applications a two stage converter circuit is normally needed: A Power Factor Correction circuit, called PFC circuit hereafter, to convert the AC input to a DC bus voltage with controlled input current profile to follow the sine wave shape of the AC input voltage; and an isolated DC to DC converter stage to convert the DC voltage of the PFC output to another DC voltage that is isolated from the AC input side.

A number of PFC circuits have been developed along the course. Some typical examples are described in FIG. 1 conceptually. In FIG. 1, circuit A shows an example of a popular approach that uses a bridge rectifier 10 to convert the mains AC input to a rectified DC signal, and a boost stage consisting of an inductor 20, a switch 30, a diode 40 and a filter capacitor 50, to boost the rectified DC signal to a DC voltage greater than the maximum peak amplitude of the mains AC input across capacitor 50. With such boost configuration the current of inductor can be fully controlled by the switching operation of switch 30 to follow the sine wave shape of the input voltage to realize the PFC function. The operation principle of such circuit is well understood by those skilled in the art, and hence will not be further detailed herein. Down the power conversion stream an isolated DC-DC converter stage is normally utilized to convert the boosted DC voltage to the desired output.

Circuits B and C in FIG. 1 are conceptual examples of bridgeless PFC approach to eliminate the input rectifier bridge and the associated power loss. The circuit of FIG. 1B utilizes two bridge arms consisting of a switching device 20, 40 at low side respectively and a diode 10, 30 on the high side respectively. Across the switching nodes of the two bridge arms is the mains AC input connected in series with an inductor 50. The operation of the two switches is controlled according to the polarity of the AC input voltage, when the left side of the AC input is positive, the left bridge arm works as a boost circuit, the current of inductor 50 is controlled by switch 20 when it is on, and when switch 20 is off, the inductor current freewheels through the AC input, diode 10, capacitor 60, and switch 40 to charge capacitor 60. Similarly, when the right side of the AC input is positive, the right side bridge arm works as a boost circuit. Since the operation principle of such approach is well understood by those skilled in the art, it will not be elaborated herein. Here the output voltage across capacitor 60 also needs to be higher than the maximum peak amplitude of the AC input, and an isolated DC-DC converter will be deployed to convert this voltage to the desired output. To further improve the efficiency, diode 10 and 30 can be replaced with witching devices to yield lower conduction loss and better reverse recovery behavior.

The circuit of FIG. 1C utilizes two bridge arms, one consists of two diodes 10 and 20, and one consists of two switching devices with switch 30 on the high side and switch 40 on low side. In FIG. 1C the diode arm is on the left side and the switch arm on the right side as an example, cross the switching nodes of the two bridge arms is the mains AC input connected in series with an inductor 50. During operation when the left side of the AC input is positive, the switch 30 on the high side controls the current of inductor 50 when it is on, the inductor current builds up through the loop of AC input, diode 10, switch 30, and inductor 50, and when 30 is off, switch 40 turns on, the current of inductor 50 freewheels through AC input, diode 10, capacitor 50, and switch 40 to charge capacitor 50. Vise versa, when the right side of the AC input is positive, the operation of switch 30, 40 and diode 10, 20 also swaps accordingly. The operation principle of such approach is well understood by those skilled in the art, and hence will not be further detailed herein. Also as well understood, the output voltage across capacitor 60 is higher than the maximum peak amplitude of the AC input during operation, and an isolated DC-DC converter will be deployed to convert this voltage to the desired output. To further improve the efficiency, diode 10 and 20 can be replaced with witching devices to yield lower conduction losses. One of the advantages of FIG. 1C circuit is that at continuous current mode, diode 10 and diode 20 remains continuous conducting over the entire half cycle of the mains AC input, and thus avoiding reverse recovery of the diodes at switching transition and the associated losses.

In addition to the above conceptual prior art approaches, there are some other variations in the AC to DC conversion topology. The principles of these are well understood by to the people skilled in the art, and hence will not be further elaborated herein. It is obvious that in these approaches some of the switching devices are operating in hard switching mode, and in high power applications additional devices and circuitry are needed to limit the inrush current at startup of the input power before the capacitor voltage reached the peak amplitude of the AC input voltage. Therefore it is highly desirable if an approach can be found with simplified system design, improved efficiency and performances while maintaining competitive system cost and reduced space requirement of the system.

SUMMARY OF THE INVENTION

It is the intention of the present invention to employ a single conversion stage on the primary side to achieve an AC to DC power conversion with soft switching operation and without the need of adding an inrush current limiting circuitry at the input side. The invented converter circuit utilizes two bridge arms both consist of two switching devices, one on the high side and the other on the low side, the mains AC input voltage is connected across the positive terminals, i.e. the positive terminal of the high side switch, of the two bridge arms, and an isolation transformer with its primary winding connected in series with a capacitor and then connected across the switching nodes of the two bridge arms. During operation the high side and low side switches of the bridge arms turn on and off according to the control method detailed below to couple the energy from the AC input to the secondary side through the isolation transformer, and then convert the energy to a DC output voltage by the rectifier circuit on the secondary side.

In one embodiment, during a particular half cycle of the AC input voltage, the bridge circuit seeing negative polarity of the AC input voltage at its positive terminal keeps both its high side and low side switches in conduction mode, and the bridge circuit seeing positive polarity of the AC input at its positive terminal operates as the active bridge in series resonant conversion mode. The series resonant conversion operation turns the high side and low side switches on and off alternatively with symmetric duty cycle near full duty, with a dead time inserted at each switching transition to prevent shoot through, and controls the voltage gain of the converter by varying the operating frequency and thus adjusting the amplitude of the voltage applied to the transformer to force the input current profile to follow the sine wave shape of the reference signal which is in synchronous and proportional to the AC input voltage, while the output voltage regulation is maintained by adjusting the amplitude of the reference sine wave signal by the voltage control loop. With such approach the two bridge arms operate as active bridge alternatively following the polarity change of the AC input voltage, eliminating the need of input rectifier bridge and in the meanwhile, realizing combined functions of PFC and DC-DC conversion with soft switching operation.

In one embodiment, during a particular half cycle of the AC input voltage, the bridge circuit seeing negative polarity of the AC input voltage at its positive terminal keeps both the high side and low side switches in conduction mode, and the bridge circuit seeing positive polarity of the AC input at its positive terminal operates as the active bridge in PWM control mode. In PWM control operation the high side switch is turned on with a varying pulse width according to the demand for the input current amplitude control and output voltage regulation from the control loop, and the low side switch turns on and off in a complementary manner according to the operating state of the high side switch, with a dead time inserted at each switching transition to prevent shoot through. The profile of the input current is forced by the PWM control to follow the reference sine wave signal which is in synchronous and proportional to the AC input voltage, while the output voltage regulation is maintained by adjusting the amplitude of the reference sine wave signal by the voltage control loop. With such approach the two bridge arms operate as active bridge alternatively following the polarity change of the AC input voltage, eliminating the need of rectifier bridge and in the meanwhile, realizing combined functions of PFC and DC-DC conversion with soft switching operation.

In one embodiment, the two bridge arms operate synchronously with simultaneous on and off of both their high side switches and low side switches respectively. The switching control of the bridge arms is in series resonant conversion mode with the high side switch and low side switch turning on and off alternatively with symmetric duty cycle near full duty, with a dead time inserted at each switching transition to prevent shoot through, and controls the voltage gain of the converter by varying the operating frequency and thus adjusting the amplitude of the voltage applied to the transformer to force the input current profile to follow the reference sine wave signal which is in synchronous and proportional to the AC input voltage, while the output voltage regulation is maintained by adjusting the amplitude of the reference sine wave signal by the voltage control loop. In such operation mode the two bridge arms operate with identical switching control, with which the control circuit design can be simplified, and the polarity of the input current changes automatically with the polarity change of the input voltage, thus eliminating the need of input rectifier bridge and in the meanwhile, realizing combined functions of PFC and DC-DC conversion with soft switching operation.

In one embodiment, the two bridge arms operate synchronously with simultaneous on and off of both their high side switches and low side switches respectively. The switching control of the bridge arms is in PWM control mode, with which the high side switch is turned on with a varying pulse width according to the demand for the input current amplitude control and output voltage regulation from the control loop, and the low side switch turns on and off in a complementary manner to the operating state of the high side switch, with a dead time inserted at each switching transition to prevent shoot through. The profile of the input current is forced by the PWM control to follow the sine wave reference signal which is in synchronous and proportional to the AC input voltage, while the output voltage regulation is maintained by adjusting the amplitude of the reference sine wave signal with the voltage control loop. In such operation mode the two bridge arms operate with identical switching control, with which the control circuit design can be simplified, and the polarity of the input current changes automatically with the polarity change of the input voltage, thus eliminating the need of input rectifier bridge and in the meanwhile, realizing combined functions of PFC and DC-DC conversion with soft switching operation.

In one embodiment, on the secondary side of the transformer a full bridge rectifier is utilized to convert the AC voltage from the transformer secondary winding to a DC output voltage. The full bridge rectifier consists of two bridge arms with each arm has a high side switch and a low side switch. Under normal operating condition the full bridge circuit operates in synchronous rectification mode with the two pairs of diagonal switches turning on and off alternatively in correspondence to the polarity change of the voltage from the secondary winding, the high side switch of the arm seeing positive voltage and the low side switch of the arm seeing negative voltage turning on, and the counterpart diagonal switches turning off. Under the circumstance that the amplitude of the voltage from the secondary winding is not sufficient to maintain positive current flow to the output, the diagonal switches are turned off to prevent discharge of the output capacitor, and the operation of the full bridge circuit changes from synchronous rectification mode to boost mode to maintain the ability of forcing the input current profile to follow the reference sine wave signal in synchronous with the AC input voltage. Detailed description of such boost mode operation will be provided in paragraph hereafter.

These and other objects and advantages of the present invention will become more apparent from the following description taken in conjunction with the accompanying drawings. It is to be understood that with the principles as taught herein, the invention may be embodied or carried out in a manner that achieves or optimizes one advantage or group of advantages with different combination of the design and operating parameters.

DETAILED DESCRIPTION OF THE INVENTION

As described in paragraphs 3 through 7, one of the common characteristics of conventional PFC circuit is that hard switching always exists during the circuit operation. As well understood, hard switching causes excessive switching losses and noise interferences, and also diode reverse recovery at hard switching transition will further add switching losses and noise emission. New generation of power devices such as SIC MOSFET and GaN devices etc. can help to reduce hard switching losses but such losses and noise emission still exist. Further, at start up of the input power, the inrush current due to the uncontrolled capacitor charge could be unacceptably high if there is no inrush current limiting circuit in place, and in addition, a DC-DC converter circuit is needed in combination with the PFC stage to fulfil the AC-DC conversion process, thus the whole AC-DC conversion system needs two power conversion stages on the primary side with associated cost and power losses. Therefore, if the whole AC to DC conversion process can be fulfilled with a single power circuit stage on the primary side, favorably with soft switching performance and without the need of inrush current limiting circuit, it would be highly desirable for the industry.

Figure 1:
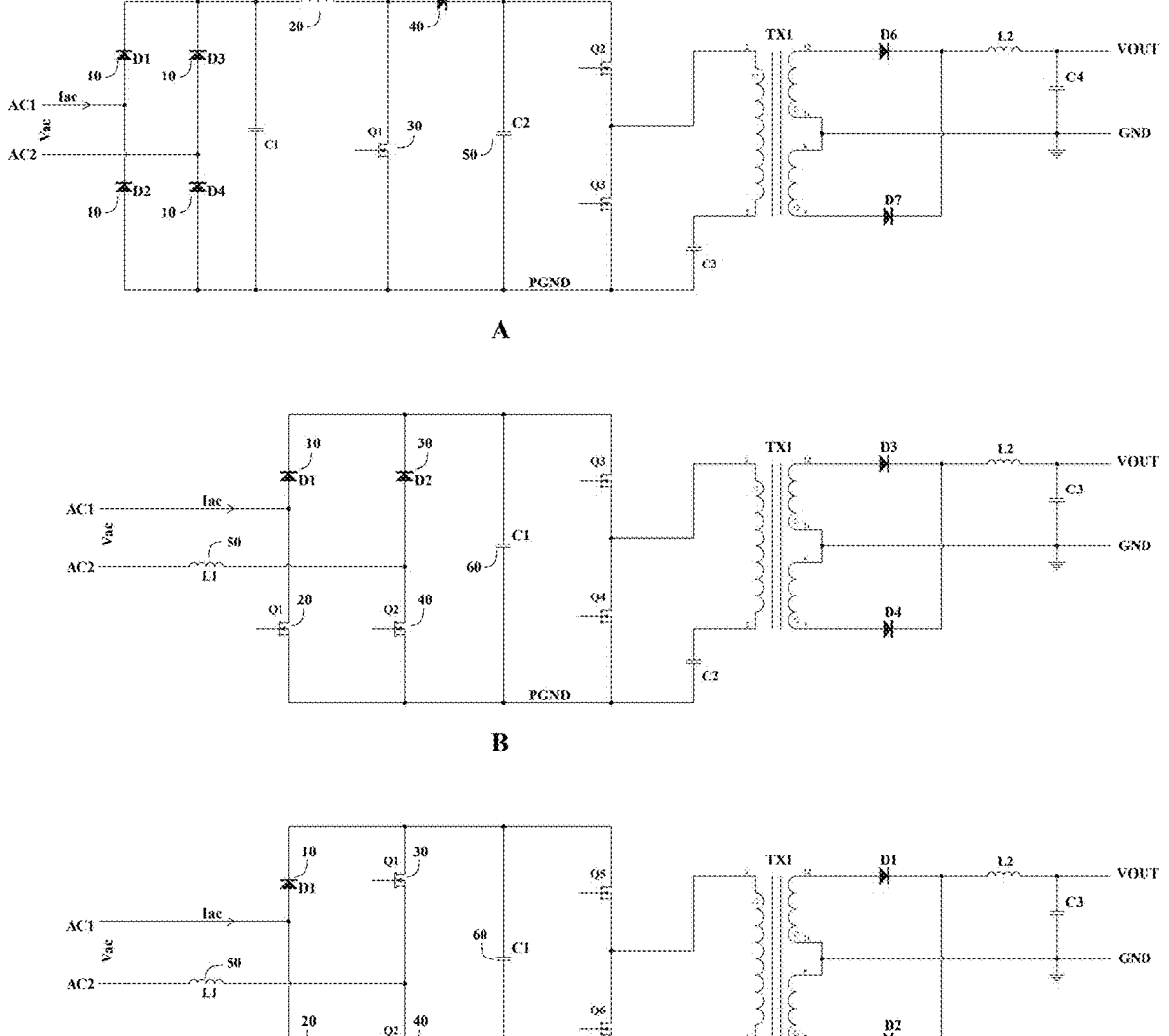
FIG. 1 conceptually describes prior art AC-DC converter architectures with three typical PFC topologies illustrated in circuit drawings A, B and C.
Figure 2:
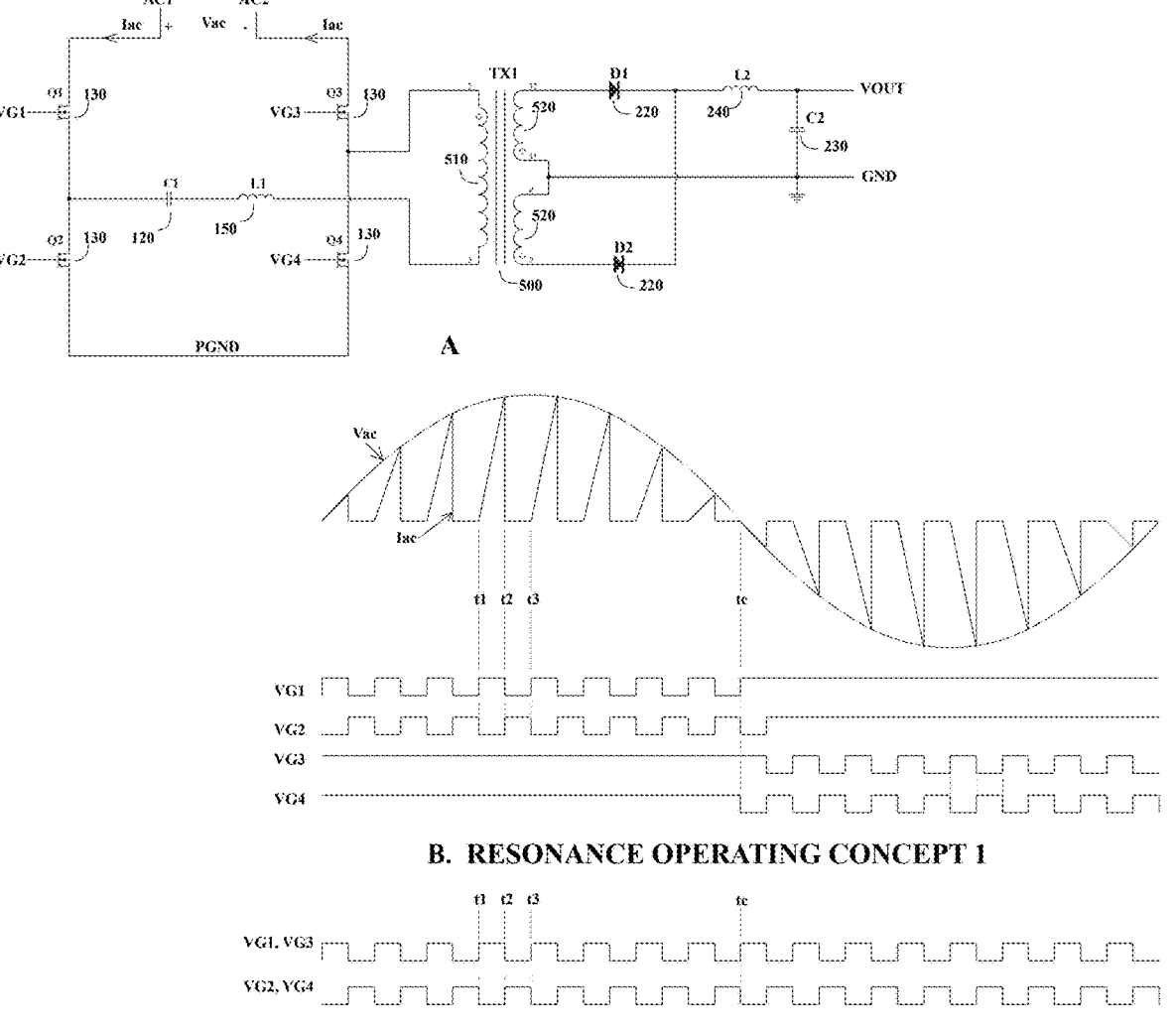
FIG. 2 describes a conceptual circuit of the present invention with illustration of the key operating waveforms of resonant operation methods.

A basic conceptual circuit of such idea is illustrated in FIG. 2. As shown in FIG. 2, the concept of the present invention utilizes two bridge arms, one on left side and one on right side, both bridge arms consist of two switches 130 with the first switch at high side and second switch at low side, the negative terminal of the high side switch and the positive terminal of the low side switch are connected together to form the switching node of the bridge arm, the negative terminal of the two low side switches of the bridge arms are connected together as the power ground PGND, the AC input source is connected across the positive terminals of the high side switches of the two bridge arms; An isolation transformer 500 with a primary winding 510 and a secondary winding 520, the primary winding 510 is connected to an inductor 150 and a capacitor 120 in series with its second terminal connected to the second terminal of inductor 150 and the first terminal of inductor 150 connected the second terminal of capacitor 120, such serial circuit is connected across the switching nodes of the two bridge arms, with the first terminal of capacitor 120 connected to the switching node of the left bridge arm and the first terminal of 510 connected to the switching node of the right bridge arm, note that inductor 150 is optional depending on design considerations and if not used, the second terminal of 510 is connected to the second terminal of capacitor 120, also capacitor 120 can be split into two with an additional capacitor connected between the first terminal of winding 510 and the switching node of the right side bridge arm, for conveniences such as current or voltage sensing purposes; The secondary winding 520 is center tapped for the convenience of explaining the concept with an example of utilizing a full wave rectification circuit, with its first terminal on top connected to the anode of first rectifier diodes 220, and its third terminal at bottom side connected to the anode of the second rectifier diode 220, the cathodes of the two rectifier diodes are connected together to the first terminal of inductor 240, the second terminal of inductor 240 is connected to the first terminal of capacitor 230 to form positive terminal of the output voltage, the second terminal of capacitor 230 is connected to the second terminal of secondary winding 520, which is the center tap of the winding, to form the ground return GND of the output voltage. It should be noted that other forms of rectifier circuit, such as full bridge rectifier circuit, can also be employed to replace the full wave rectifier circuit to fulfil the same functionality for the system without departing from the spirit of the present invention, and further, other devices such as MOS-FET, GaN devices etc. can also be utilized to replace the rectifier diodes 220 without departing from the spirit of the present invention.

Such circuit configuration essentially enables a bidirectional series resonant half bridge operation, with the two bridge arms operating as active half bridge alternatively following the polarity change of the AC input voltage. The operation of the circuit can be explained by referencing the conceptual operating waveforms illustrated in FIGS. 2B and C. As shown in FIG. 2B, a sinusoidal waveform represents the AC input voltage Vac corresponding to the polarity sign '+' on the left side and '−' on the right side in the circuit drawing, indicating that during positive half cycle the voltage on the left side is positive, and vise versa, during negative half cycle the voltage on the right side is positive. The switching control waveforms of the switches are illustrated in waveforms B and C are in correspondence to the defined AC input voltage polarity, with waveforms of FIG. 2B represent operating concept 1 and waveforms of FIG. 2C represent operating concept 2. It is obvious that with such circuit configuration there is no uncontrollable inrush current exists on the primary side at input power up, and the charging current for the output capacitor on the secondary side at start up is controllable by the circuit operation, therefore a dedicated inrush current limiting circuit is not needed.

As illustrated by the waveforms of FIG. 2B, during the positive half cycle of the AC input voltage, the left side bridge arm is applied with a positive voltage, during this period two switches of the right side bridge are both turned on to short the right side terminal of AC input to power ground PGND, and the left side bridge works as the active bridge in resonant conversion mode with its high side and low side switches turning on and off alternatively at symmetrical duty cycle near full duty of 50%, with a small dead time inserted at each switching transition to prevent shoot through. As well understood by those skilled in the art, in resonant converter operation the voltage gain of the circuit can be adjusted by varying the switching frequency, the circuit normally works in inductive region and the voltage gain increases when switching frequency goes lower. With such principle the voltage applied to the primary winding of transformer 500 can be controlled by the switching frequency in combination with the instantaneous amplitude of the input voltage, to force the profile of the input current to follow the reference sine wave signal, which is in synchronous and proportional to the AC input voltage, to realize the PFC function, and in the meanwhile, the output voltage can be regulated by adjusting the amplitude of the reference sine wave signal through the voltage control loop. When the polarity of the AC input voltage becomes positive on the right side, the operation mode of the two bridge arms also swaps accordingly with the two switches of the left side bridge turning fully on and the switches of the right side bridge operating as the active bridge in resonant conversion mode, thus fulfilling the functions of AC to DC conversion with a single stage power circuit on the primary side.

As well understood by those skilled in the art, with such operation that the two switches of a bridge arm turns on and off alternatively with a short dead time inserted at the switching transitions, the inductive current of the transformer primary winding can create a zero voltage condition during dead time after a switch is turned off, and hold the condition for the switch to be turned on at the end of the dead time, and thus achieving a switching operation of zero voltage turn on for the switching devices. It should be noted that the current waveform in FIG. 2B is conceptually illustrated to explain the operating principle to show how the profile of the input current is controlled to follow the sine wave shape of the input voltage, It can be regarded that the AC voltage waveform and the input current waveform are using different vertical scales in the drawing, and such presentation makes it easier to understand the operating principle without departing from the spirit of the present invention. It should also be noted that although the switching control waveforms in FIG. 2 is illustrated with a constant frequency for simplicity of presentation, the switching frequency is being adjusted during operation by the control loop to fulfil the functionalities of Power Factor Correction and output voltage regulation etc.

The operation of the diode rectifier circuit is publicly well understood and will not be further elaborated herein. It should be noted that in resonant converter operation, the primary side switches are operating at near full duty, the voltage appears at the cathodes of the rectifier diodes is almost continuous except the short dead time period, therefore the output inductor 240 can be removed to save cost and simplify the circuit. It should also be noted that because the profile of the input current and the amplitude of the input voltage change simultaneously, the voltage gain of the resonant converter circuit is nearly constant for the current profile control over large part of the sine wave of the input voltage at constant load condition, until when the AC input voltage approaches near zero crossing point. At the region near zero crossing point of the input voltage, the coupled voltage in the secondary winding may not be sufficient to generate positive current to supply to the output even when the voltage gain of the converter has increased to the maximum value, and consequently the reflected input current will drop to near zero. Under such circumstance, the power factor of the converter system may not be able to get very close to the unity value of 1. On the other hand, however, a power factor value in the range of 0.93 to 0.95 can be obtained even with such phenomenon in practical applications. Such power factor value is sufficient for many of the application cases. For applications that require near unity power factor, a specific scheme is further developed with the present invention to keep the profile of the input current following the sine wave reference near zero crossing region of the AC input voltage, as to be elaborated in paragraph [0029].

On the other hand, as well understood by those skilled in the art, wider voltage gain range of the converter can be obtained with higher leakage to magnetizing inductance ratio. Under such consideration, the external inductor 150 is essentially in series with the leakage inductance of transformer 500 to serve the purpose of extending the voltage gain range. With the increased voltage gain range, the zero current zone near zero crossing point of the AC input voltage can be reduced and thus helping to improve the power factor of the system. If the leakage inductance of transformer is made sufficiently large and the power factor and other performance requirements can meet the specification requirement by utilizing only the leakage inductance of transformer 500, inductor 150 can be removed from the circuit to save cost and space requirement.

Another operating principle is conceptually described in FIG. 2C. As shown by the waveforms of FIG. 2C, the high side switch and low side switch of both bridge arms are turned on and off alternatively with symmetrical duty cycle near full duty with a small dead time inserted at each switching transition to prevent shoot through, and the switching operation of the left side bridge and right side bridge is synchronized with each other, i.e. the high side switches of left side bridge and right side bridge are turned on and off simultaneously, and the low side switches of left side bridge and right side bridge are also turned on and off simultaneously. Thus during the half switching cycle that the high side switches of the two bridges are on, current flows from the input source through the two high side switches to energize capacitor 120, inductor 150 and transformer 500 through its primary winding 510, and during the next half switching cycle that the low side switches of the two bridges are on, the energy stored in capacitor 120 discharges through the two low side switches to inductor 150 and transformer 500 through its primary winding. Such operation realizes the same functionalities as concept 1 does, with the converter circuit operating in series resonant mode to force the current profile of the AC input to follow a reference sine wave signal which is in synchronous and proportional to the AC input voltage, and adjusting the amplitude of the reference signal through the voltage control loop to provide regulated DC voltage to the output. An interesting point is that such switching operation does not need the control logic of incorporating the polarity information of the AC input voltage in the switching control of the two bridges, the current flowing in the circuit changes its direction automatically with the polarity of the AC input voltage.

Figure 3:
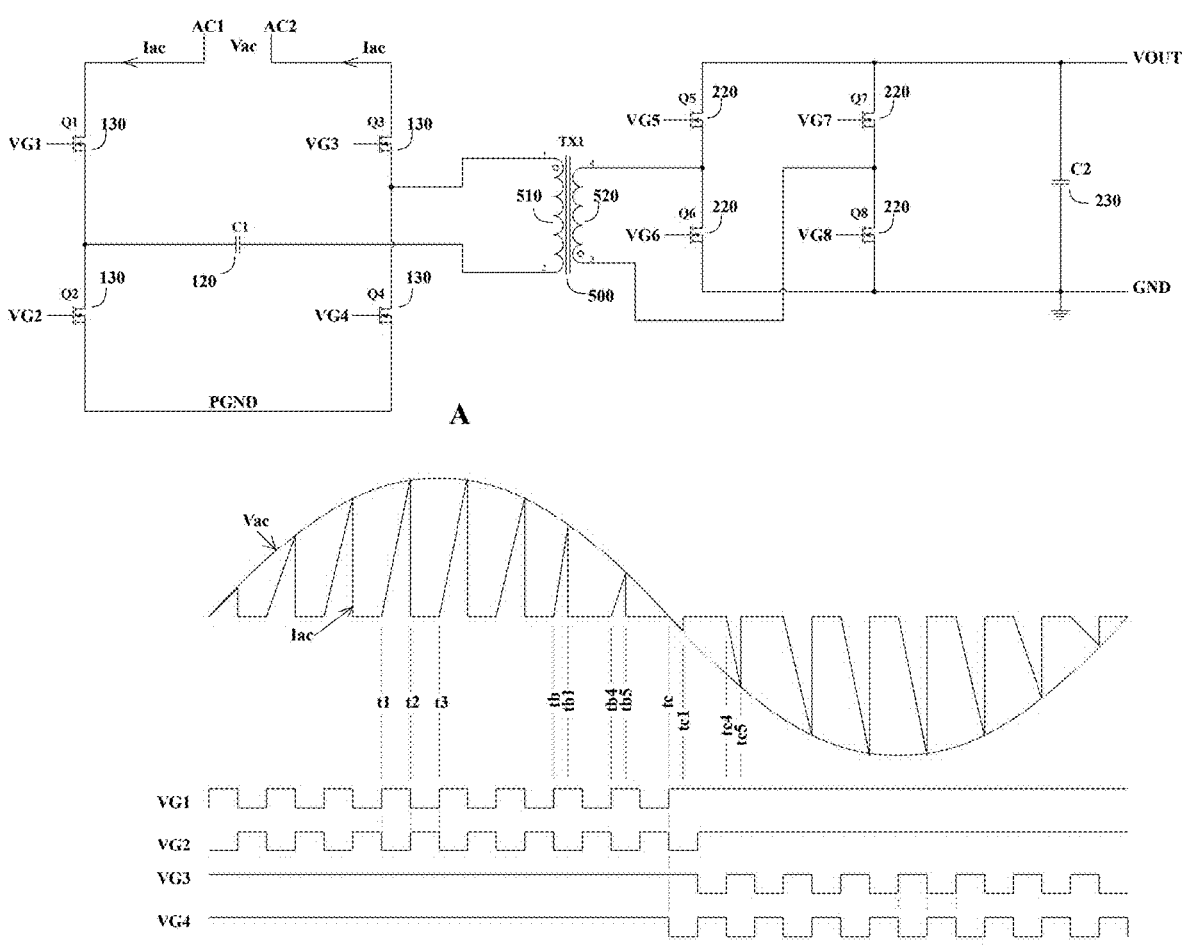
FIG. 3 describes an example circuit of the present invention with full bridge rectifier circuit and key waveforms of normal operation and the invented boost operation method near zero crossing region of the AC input voltage.
Figure 3:
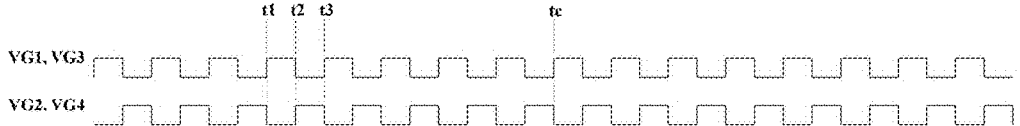
Figure 3:
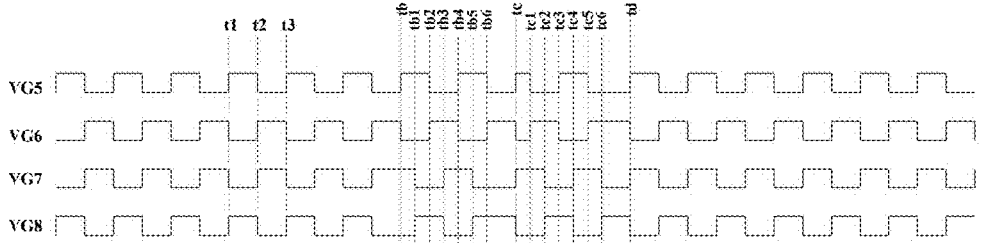

As described in paragraph [0024], at the region near zero crossing point of the AC input voltage, the coupled voltage in the secondary winding of transformer 500 becomes not sufficient to generate positive current to supply to the output, and thus the current from the AC input source will be near zero, affecting the result of power factor correction. In order to overcome this problem, another concept is further invented to maintain the controllability of the input current profile under such particular circumstance, and thus achieving a power factor near unity, as conceptually described in FIG. 3. As shown in FIG. 3, the primary side circuit remains unchanged, while a full bridge rectifier circuit is employed on the secondary side. The full bridge rectifier circuit uses four switches 220 to form two bridge arms, each consisting of a high side switch and a low side switch; The positive terminals of the high side switches of the two bridge arms are connected together as the positive output terminal VOUT of the full bridge rectifier, and the negative terminals of the low side switches of the two bridge arm are connected together as the return ground GND of the output, the negative terminal of high side switch and positive terminal of low side switch of each bridge are connected together to form the switching node of the bridge arm respectively; The secondary winding 520 of transformer 500 is connected across the switching nodes of the two bridge arms, with its first terminal connected to the switching node of the left side bridge and second terminal to the switching node of the right side bridge; a capacitor is connected across the positive output terminal and the return ground terminal.

During normal operation when the voltage from secondary winding of transformer 500 is sufficient for the system to maintain the functionality of keeping the current profile of the AC input to follow the reference sine wave signal, the full bridge operates in synchronous rectifier mode, with the high side switch of the left side bridge and the low side switch of the right side bridge are turned on when the voltage from the first terminal of secondary winding 520 is positive, and vice versa, the high side switch of right side bridge and the low side switch of left side bridge are turned on when the voltage from the second terminal of secondary winding 520 is positive. It should be noted that the relation between the voltage polarity of the secondary winding and switching action of the primary side bridges changes with the AC input voltage polarity. During positive half cycle of the AC input voltage, the voltage at the first terminal of the secondary winding is positive when the high side switch of the primary side bridges are on, and during negative half cycle of the AC input voltage, the voltage at the second terminal of the secondary winding is positive when the high side switch of the primary side bridges are on, and hence the switching sequence of the rectifier bridge corresponding to the primary side bridge operation will also change according to the operating principle described above. When the AC input voltage approaches the region near zero crossing point, the amplitude of the voltage from secondary winding 520 becomes not sufficient for the system to maintain the functionality of keeping the current profile of the AC input to follow the reference sine wave signal with synchronous rectification operation. Under such circumstance the rectifier bridge circuit changes its operation to boost mode, to continually keep the input current profile following the sine wave shape of the reference signal.

A conceptual operating waveform of such boost operation is illustrated in FIG. 3D. As illustrated by the waveforms, during positive half cycle when the AC input voltage approaches near zero crossing point tc, the amplitude of the voltage becomes insufficient for the system to maintain the functionality of keeping the current profile of the AC input to follow the reference sine wave signal, which is in synchronous and proportional to the AC input voltage, with the rectifier bridge operating in synchronous rectification mode from time point tb. Under such circumstance, the operation of the rectifier bridge changes to boost mode as described below. For example, at tb the voltage of the first terminal of secondary winding 520 is positive, in synchronous with the on state of the high side switch of the left bridge arm on the primary side, the high side switches of the left rectifier bridge arm and right rectifier bridge arm are both on, the current in the leakage inductance of secondary winding 520 is building up through the loop shorted by the two switches of the rectifier bridge arms at on state. During this period, because the voltage at the first terminal of 520 is positive, the current in the secondary winding flows out from its first terminal, then from the negative terminal to positive terminal of the high side switch of the left bridge arm, and then from positive terminal to negative terminal of the high side switch of the right bridge arm, and return to its second terminal. Under such circumstance the current from the AC input increases accordingly, and when the current of the AC input reaches the desired amplitude according to the sine wave reference signal, the high side switch of the right bridge arm is turned off and the low side switch of the right bridge arm is turned on at tb1 while the high side switch of the left bridge arm remains on, thus the current in the leakage inductance changes its path to flow through the high side switch of the left bridge arm to the output and return through the low side switch of the right bridge arm; When the voltage from second winding changes its polarity to become positive on the second terminal of 520 at tb2, the high side switch of the left bridge arm is turned off and the low side switch of the left bridge arm is turned on while the low side switch of the right bridge arm remains on, then the current in leakage inductance of 520 starts building up through the two low side switches, and when the reflected input current reaches the desired amplitude according to the sine wave reference voltage, the low side switch of the right bridge arm is turned off and the high side switch of the right side bridge arm is turned on at tb3, while the low side switch of the left bridge arm remains on, the current stored in the leakage inductance of secondary winding flows to the output through the high side switch of the right bridge arm and return through the low side switch of the left bridge arm, thus maintaining the capability of forcing the profile of the AC input to follow the sine wave reference signal at the region near zero crossing point of the AC input voltage to achieve near unity power factor.

The boost operation continues after the AC input voltage crosses the zero point at tc and enters negative half cycle. The operating waveforms are also illustrated in waveform train D. At time td the amplitude of the AC input voltage becomes sufficient for maintaining the functionality of keeping the current profile of the AC input to follow the reference sine wave signal with the rectifier bridge operating in synchronous rectification mode, the operation of the rectifier bridge changes back to synchronous rectification mode. The boost operation of this period is based on the same principle as described above, and hence is not further elaborated herein.

It can be seen from the example waveform D that such boost operation is essentially achieved by shifting the phase between the switching waveforms of the two rectifier bridge arms. It should be noted that the switching operation described herein is used as an example to explain the operation principle of the present invention. The general principle of such boost operation is that the high side switches of the two bridge arms or the low side switches of the two bridge arms turn on simultaneously and in synchronous with the voltage signal from the secondary winding to build up current in the leakage inductance of the secondary winding, when the reflected current on the primary side reaches the required amplitude for the profile of the input current from the AC voltage source to follow the reference signal, the switch with current flowing in the direction from its positive terminal to negative terminal is turned off, and the counterpart switch of the same bridge arm is turned on to provide a path for the inductive current in the secondary winding to flow to the output. With such operating principle, other switching patterns are also possible to achieve the same result without departing from the spirit of the present invention.

Figure 4:
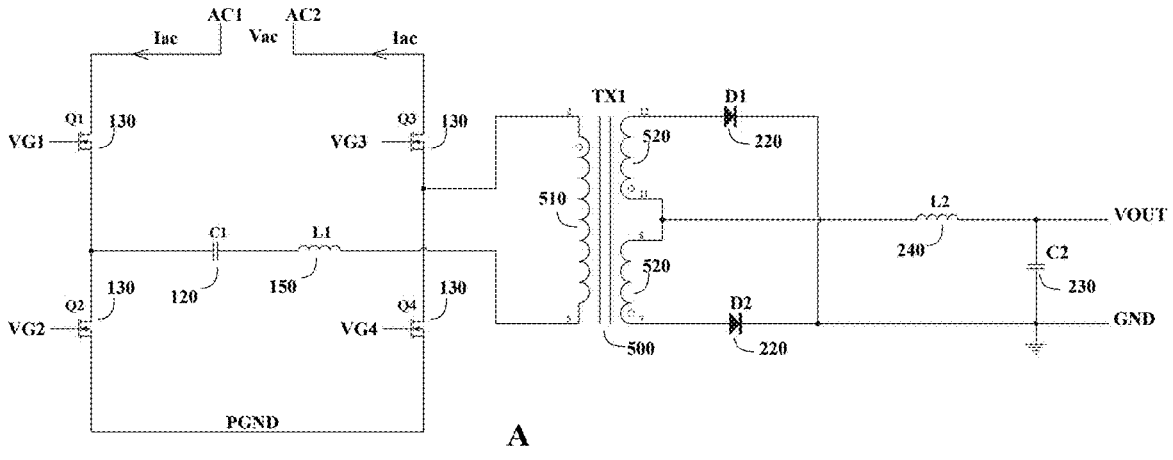
FIG. 4 illustrates an example circuit of the present invention with illustration of key operating waveforms of PWM control methods.
Figure 4:
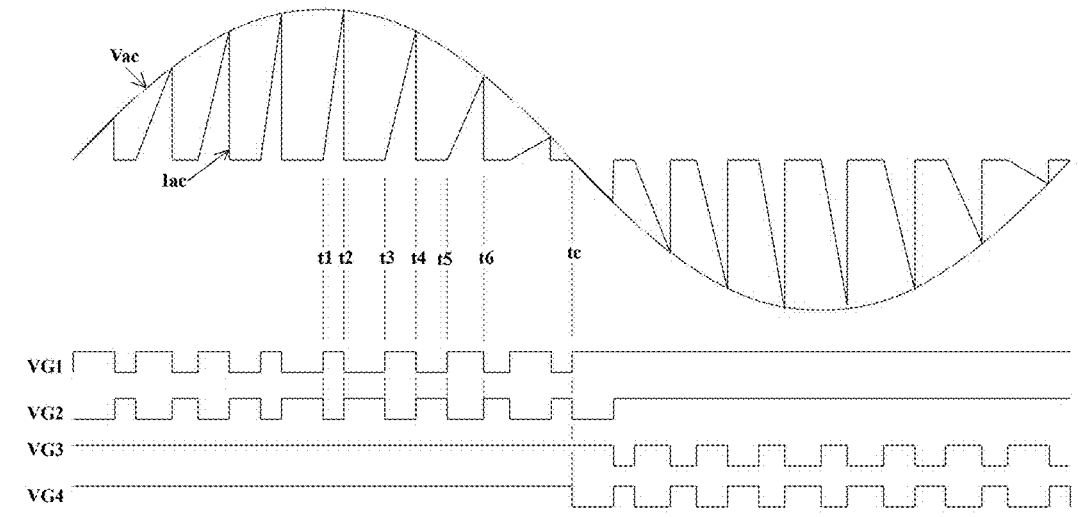
Figure 4:
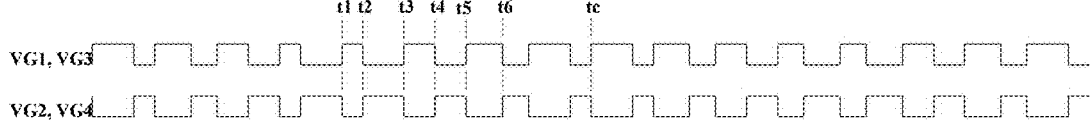

FIG. 4 illustrates another operating concept of the present invention. As illustrated in FIG. 4, the concept uses similar circuit configuration as FIG. 3 but with different switching control method as illustrated by the conceptual operating waveforms, and accordingly, capacitor 120 will use different value to satisfy the function it plays in the circuit operation. As described by the operating waveforms, the operation principle of this concept utilizes Pulse Width Modulation scheme, referred as PWM hereafter, to control the input current profile and output voltage regulation, and correspondingly, capacitor 120 serves a DC blocking function with larger capacitance compare with the resonant capacitor function as in the series resonant operation described in FIG. 2 and FIG. 3.

As illustrated in FIG. 4, the PWM operation concept is realized with two different switching control schemes as described by waveform B for the first scheme and waveform C for the second scheme. Waveform B shows the first scheme that the two switches of the bridge arm seeing negative voltage from the AC input are both turned on to short the negative side of the AC input to power ground PGND, and the two switches of the bridge arm seeing positive voltage of the AC input turn on and off alternatively in complementary manner under PWM control with a small dead time inserted at each switching transition to prevent shoot through, to couple the input energy to the secondary side through transformer 500. With such scheme the PWM operation controls the voltage applied to primary winding 510 to force the profile of the input current to follow the reference sine wave shape signal, which is in synchronous and proportional to the input voltage, and the output voltage is regulated by adjusting the amplitude of the reference sine wave signal through the voltage control loop. Note that the voltage applied to primary winding 510 is asymmetric with different width of the positive and negative half cycles, and capacitor 120 fulfils the function of balancing the volt time product, i.e. the product of voltage multiplying the time duration, of the positive and negative half cycle of the primary winding 510. With complementary switching operation of the bridge circuit, soft switching is also realized as explained in paragraph [0023].

The second switching scheme of the PWM control concept is illustrated with waveform C in FIG. 4. As shown by waveform C, the high side switch and low side switch of both primary side bridge arms are turned on and off alternatively in complementary manner with a small dead time inserted at each switching transition to prevent shoot through, and the switching operation of the left side bridge and right side bridge is synchronized with each other, i.e. the high side switches of left side bridge and right side bridge are turned on and off simultaneously, and the low side switches of left side bridge and right side bridge are also turned on and off simultaneously. Thus during the half switching cycle that the high side switches of the two bridges are on, current flows from the input source through the two high side switches to energize capacitor 120 and transformer 500 through its primary winding 510, and during the next half switching cycle that the low side switches of the two bridges are on, the energy stored in capacitor 120 discharges through the two low side switches to transformer 500 through its primary winding 510. In such operation the voltage applied to primary winding 510 is the same as the first scheme to fulfil the function of forcing the current profile of the AC input to follow a reference sine wave signal which is in synchronous and proportional to the AC input voltage, and adjusting the amplitude of the reference signal through the voltage control loop to provide regulated DC voltage to the output.

During normal operation of both scheme 1 and scheme 2, when the voltage from the secondary winding is sufficient to maintain the functionality of forcing the current profile of the AC input to follow the reference sine wave signal, the bridge circuit at secondary side operates in synchronous rectifier mode with the diagonal switches turning on and off in synchronous with the switching operation of the primary side switches. The principle of synchronous rectifier is well understood by those skilled in the art and also described in paragraph [0028], and hence is not further elaborated herein. When the amplitude of the voltage from the secondary winding 520 is not sufficient to maintain the functionality of forcing the current profile of the AC input to follow the reference sine wave signal, the bridge circuit changes operation to boost mode to continually maintain the functionality of forcing the profile of the AC input current to follow the sine waveshape of the reference signal. Details of such boost mode operation is described in paragraph [0029], [0030] and [0031] and hence is not further elaborated herein.

From the above description, the present invention realizes an AC to DC power conversion process with a single power stage at primary side with soft switching operation and without using an input bridge rectifier and inrush current limiting circuit. The concept offers advantages of improved efficiency, reduced noise, simpler circuit architecture, lower system cost and less space requirement, and other possible advantages that are not described herein. It should be noted that with the sine wave profile of the charging current, the output capacitor 230 needs to have a large capacitance to hold a constant DC voltage. Since most AC-DC power supplies needs to provide certain hold up time at power off instant, such large capacitance is always needed regardless it is on primary side or secondary side. Although the present invention is described with a bridgeless circuit architecture herein, the principle of the invention can also be realized with a circuit architecture of a rectifier bridge in combination with a switching circuit that operates with the principle of the present invention. It is also possible that in practical applications certain innovative concepts can be further developed to better utilize the advantages of the present invention and solve certain particular issues from application requirements.

While certain embodiments of the inventions have been described, these embodiments are presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. An AC-DC converter system comprising:
A sinusoidal AC voltage source with its first terminal and second terminal; A bridge circuit consists of a first bridge arm and a second bridge arm, each said bridge arm consists of a first switch at high side and a second switch at low side, the negative terminal of the first switch and the positive terminal of the second switch of each said bridge arm are connected together respectively to form a switching node of each said bridge arm, the negative terminal of the second switch of said two bridge arms are connected together to form a power ground of said bridge circuit, the positive terminal of the first switch of said first bridge arm is connected to the first terminal of said AC voltage source, and the positive terminal of the first switch of said second bridge arm is connected to the second terminal of said AC voltage source; A transformer with its first winding and second winding, a capacitor with its first terminal connected to the switching node of the first bridge arm and second terminal connected to the second terminal of the first winding of said transformer, the first terminal of the first winding of said transformer is connected to the switching node of the second bridge arm, the second winding of said transformer is connected to a rectifier circuit to convert the voltage from the secondary winding to a DC output voltage; wherein the switching operation employs a series resonance scheme, the switching operation of the first bridge arm and the second bridge arm is in synchronous with identical switching action for the first switch of both bridge arms and identical switching action for the second switch of both bridge arms, and the first switches and second switches are turned on and off alternatively at symmetrical duty cycle of near 50% with a small dead time inserted at each switching transition, the voltage applied to the first winding of said transformer is adjusted by varying the switching frequency of the bridge arms, to realize the function of forcing the profile of the input current from the AC voltage source to follow the reference signal, which is in synchronous and proportional to the sine wave of the AC voltage source, the amplitude of the reference signal is adjusted by voltage control loop of the system to realize the function of output voltage regulation.

2. The AC-DC converter system of claim 1, wherein the switching operation employs a series resonance scheme, during the half cycle of the AC voltage source that the voltage of its first terminal is positive, the first bridge arm operates as active bridge arm with its first switch and second switch switching on and off alternatively at symmetrical duty cycle of near 50% with a small dead time inserted at each switching transition, the first and second switch of the second bridge arm are turned fully on during the entire half cycle of the AC voltage source; during the half cycle of the AC voltage source that the voltage of its second terminal is positive, the second bridge arm operates as active bridge arm with its first switch and second switch switching on and off alternatively at symmetrical duty cycle of near 50% with a small dead time inserted at each switching transition, the first and second switch of the first bridge arm are turned fully on during the entire half cycle of the AC voltage source; the voltage applied to the first winding of said transformer is adjusted by varying the switching frequency of the active bridge, to realize the function of forcing the profile of the input current from the AC voltage source to follow the reference signal, which is in synchronous and proportional to the sine wave of the AC voltage source, the amplitude of the reference signal is adjusted by voltage control loop of the system to realize the function of output voltage regulation.

3. The AC-DC converter system of claim 1, wherein the switching operation employs a PWM control scheme, during the half cycle of the AC voltage source that the voltage of its first terminal is positive, the first bridge arm operates as active bridge arm with its first switch and second switch switching on and off alternatively in complementary manner with a small dead time inserted at each switching transition, the first and second switch of the second bridge arm are turned fully on during the entire half cycle of the AC voltage source; during the half cycle of the AC voltage source that the voltage of its second terminal is positive, the second bridge arm operates as active bridge arm with its first switch and second switch switching on and off alternatively in complementary manner with a small dead time inserted at each switching transition, the first and second switch of the first bridge arm are turned fully on during the entire half cycle of the AC voltage source; the voltage applied to the first winding of said transformer is adjusted by varying the operating duty cycle of the active bridge, to realize the function of forcing the profile of the input current from the AC voltage source to follow the reference signal, which is in synchronous and proportional to the sine wave of the AC voltage source, the amplitude of the reference signal is adjusted by voltage control loop of the system to realize the function of output voltage regulation.

4. The AC-DC converter system of claim 1, wherein the switching operation employs a PWM control scheme, the switching operation of the first bridge arm and the second bridge arm is in synchronous with identical switching action for the first switch of both bridge arms and identical switching action for the second switch of both bridge arms, and the first switches and second switches are turned on and off alternatively in complementary manner with a small dead time inserted at each switching transition, the voltage applied to the first winding of said transformer is adjusted by varying the operating duty cycle of the bridge arms, to realize the function of forcing the profile of the input current from the AC voltage source to follow the reference signal, which is in synchronous and proportional to the sine wave of the AC voltage source, the amplitude of the reference signal is adjusted by voltage control loop of the system to realize the function of output voltage regulation.

5. The AC-DC converter system of anyone of claim 1, 2, 3 or 4, the secondary winding of said transformer has a first terminal and a second terminal; A rectifier bridge circuit consists of a third bridge arm and a fourth bridge arm, each said bridge arm consists of a first switch at high side and a second switch at low side, the positive terminal of said two bridge arms are connected together to form the positive terminal of the output, the negative terminal of the second switch of said two bridge arms are connected together to form the return ground of the output, the negative terminal of the first switch and the positive terminal of the second switch of the third bridge arm are connected together to form a switching node of the third bridge arm and connected to the first terminal of said secondary winding, and the negative terminal of the first switch and the positive terminal of the second switch of the fourth bridge arm are connected together to form a switching node of the fourth bridge arm and connected to the second terminal of said secondary winding; A capacitor with its first terminal connected to the positive terminal of the output, and second terminal connected to the return ground of the output; During operation when the amplitude of the voltage from said secondary winding is sufficient to maintain the functionality of forcing the profile of the input current from the AC voltage source to follow the reference signal, which is in synchronous and proportional to the sine wave of the AC input voltage, said rectifier bridge circuit operates in synchronous rectification mode, with the first switch of the bridge arm seeing positive voltage from the secondary winding at its switching node and the second switch of the bridge arm seeing negative voltage from the secondary winding at its switching node are at on state, and the counterpart switches of the two bridge arms are at off state; When the amplitude of the voltage from said secondary winding is not sufficient to maintain the functionality of forcing the profile of the input current from the AC voltage source to follow the reference signal, said rectifier bridge circuit operates in boost mode, with the first switch of the two bridge arms or the second switch of the two bridge arms turned on simultaneously and in synchronous with the voltage signal from the secondary winding to build up current in the leakage inductance of the secondary winding, when the reflected current on the primary side reaches the required amplitude for the profile of the input current from the AC voltage source to follow the reference signal, the switch with current flowing in the direction from its positive terminal to negative terminal is turned off, and the counterpart switch of the same bridge arm is turned on to provide a path for the inductive current in the secondary winding to flow to the output; One of the methods of realizing such boost operation is by shifting the phase between the switching waveforms of the two bridge arms of said full bridge rectifier circuit.

* * * * *